US008443500B2

(12) United States Patent
Huang

(10) Patent No.: US 8,443,500 B2
(45) Date of Patent: May 21, 2013

(54) UNIVERSAL RUBBER BUSHING EXTRACTION TOOL

(75) Inventor: Chia-Hao Huang, Taiping (TW)

(73) Assignee: Poul Chang Metal Industry Co., Ltd., Taichung Hsien (TW)

( * ) Notice: Subject to any disclaimer, the term of this patent is extended or adjusted under 35 U.S.C. 154(b) by 420 days.

(21) Appl. No.: 12/797,534

(22) Filed: Jun. 9, 2010

(65) Prior Publication Data

US 2011/0302754 A1 Dec. 15, 2011

(51) Int. Cl.
*B23P 19/04* (2006.01)

(52) U.S. Cl.
USPC .................... 29/260; 29/265; 29/278; 29/280

(58) Field of Classification Search
USPC ................... 29/260, 244, 255, 278, 259, 263, 29/265, 271, 280; 269/3, 6, 43
See application file for complete search history.

(56) References Cited

U.S. PATENT DOCUMENTS 3,216,098 A * 11/1965 Ratz ................................ 29/226
4,492,014 A * 1/1985 Alexander ....................... 29/259
4,864,709 A * 9/1989 Klucz et al. ..................... 29/259
6,389,668 B1 * 5/2002 Hwang ........................... 29/263
7,770,277 B2 * 8/2010 Wridt .............................. 29/261
7,918,003 B2 * 4/2011 Acciardo, Jr. ................... 29/263
8,042,244 B2 * 10/2011 Lai .................................. 29/275
2008/0313888 A1 * 12/2008 Mueller .......................... 29/724
2012/0151728 A1 * 6/2012 Shen ............................... 29/260

* cited by examiner

*Primary Examiner* — Jeanette E Chapman
*Assistant Examiner* — Daniel Kenny

(57) ABSTRACT

A universal rubber bushing-extracting tool includes a threaded rod and two pushing units. Each of the pushing units includes a nut, a mount, a bearing and two pushers. The nut is engaged with the threaded rod. The mount includes at least two slots defined therein. The bearing bears the mount on the nut. Each of the pushers is movably located in a related one of the slots. The pushers of one of the pushing units push an internal ring of a rubber bushing and the pushers of the other pushing unit push an external ring of the rubber bushing.

12 Claims, 9 Drawing Sheets

UNIVERSAL RUBBER BUSHING EXTRACTION TOOL

BACKGROUND OF INVENTION

1. Field of Invention

The present invention relates to rubber bushings and, more particularly, to a universal tool for extracting rubber bushings of different sizes.

2. Related Prior Art

A typical rubber bushing includes an internal ring rotationally located in an external ring. A tool is used to locate the internal ring in the external ring or remove the internal ring from the external ring.

The tool includes a threaded bolt, a first ring and a second ring. Each of the first and second rings includes a screw aperture for receiving the threaded bolt. In use, the threaded bolt is inserted through the internal ring of the rubber bushing. The first and second rings are engaged with the threaded bolt, with the rubber bushing located between the first and second rings. The first and second rings are rotated around and moved along the threaded bolt in different directions so that the first ring abuts the internal ring and that the second ring abuts the external ring. The rotation and movement of the first and second rings on the threaded bolt is continued so that the first and second rings move the internal and external rings in opposite directions to remove the internal ring from the external ring.

However, rubber bushings of different sizes are used in different positions of a vehicle for example. Rubber bushings of different sizes include internal rings of different sizes and external rings of different sizes. Therefore, the tool must include first rings of different sizes and second rings of different sizes. The first rings and the second rings are heavy and bulky. Hence, it is difficult to carry the tool including all of the first rings and the second rings. Moreover, the first rings and the second rings are expensive. Therefore, the cost of the tool including all of the first rings and the second rings is high.

The present invention is therefore intended to obviate or at least alleviate the problems encountered in prior art.

SUMMARY OF INVENTION

It is the objective of the present invention to provide a universal tool for extracting rubber bushings of different sizes.

To achieve the foregoing objective, the universal tool includes a threaded rod and two pushing units. Each of the pushing units includes a nut, a mount, a bearing and two pushers. The nut is engaged with the threaded rod. The mount includes at least two slots defined therein. The bearing bears the mount on the nut. Each of the pushers is movably located in a related one of the slots. The pushers of one of the pushing units push an internal ring of a rubber bushing and the pushers of the other pushing unit push an external ring of the rubber bushing.

Other objectives, advantages and features of the present invention will be apparent from the following description referring to the attached drawings.

BRIEF DESCRIPTION OF DRAWINGS

The present invention will be described via detailed illustration of the preferred embodiment referring to the drawings wherein.

DETAILED DESCRIPTION OF PREFERRED EMBODIMENT

Figure 1:
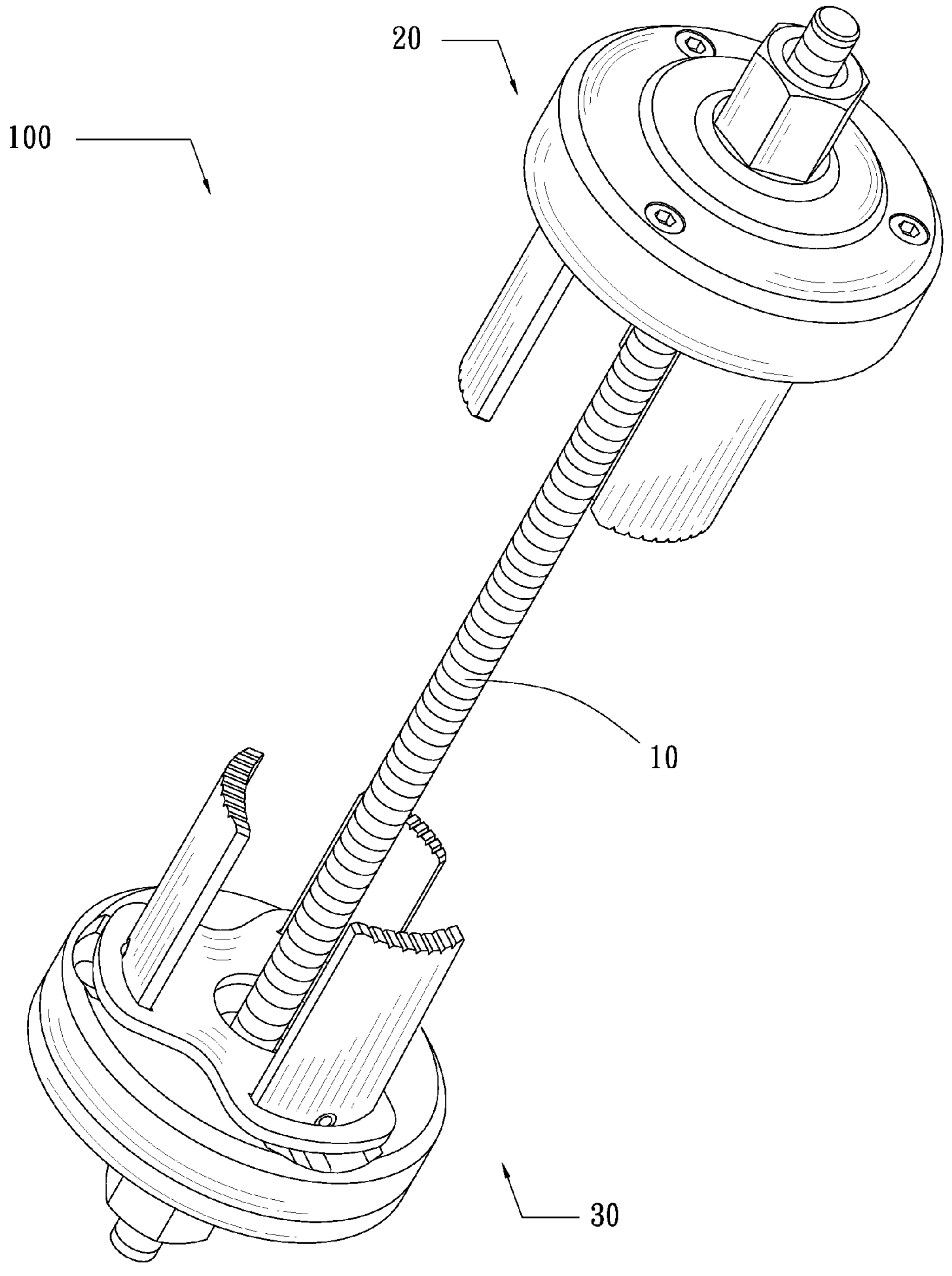
FIG. 1 is a perspective view of a universal tool for extracting rubber bushings of different sizes according to the preferred embodiment of the present invention.

Referring to FIG. 1, there is shown a universal tool 100 for extracting rubber bushings of different sizes according to the preferred embodiment of the present invention. The universal tool 100 includes a threaded rod 10, a first pushing unit 20 and a second pushing unit 30. The threaded rod 10 is made of a desired length.

Figure 2:
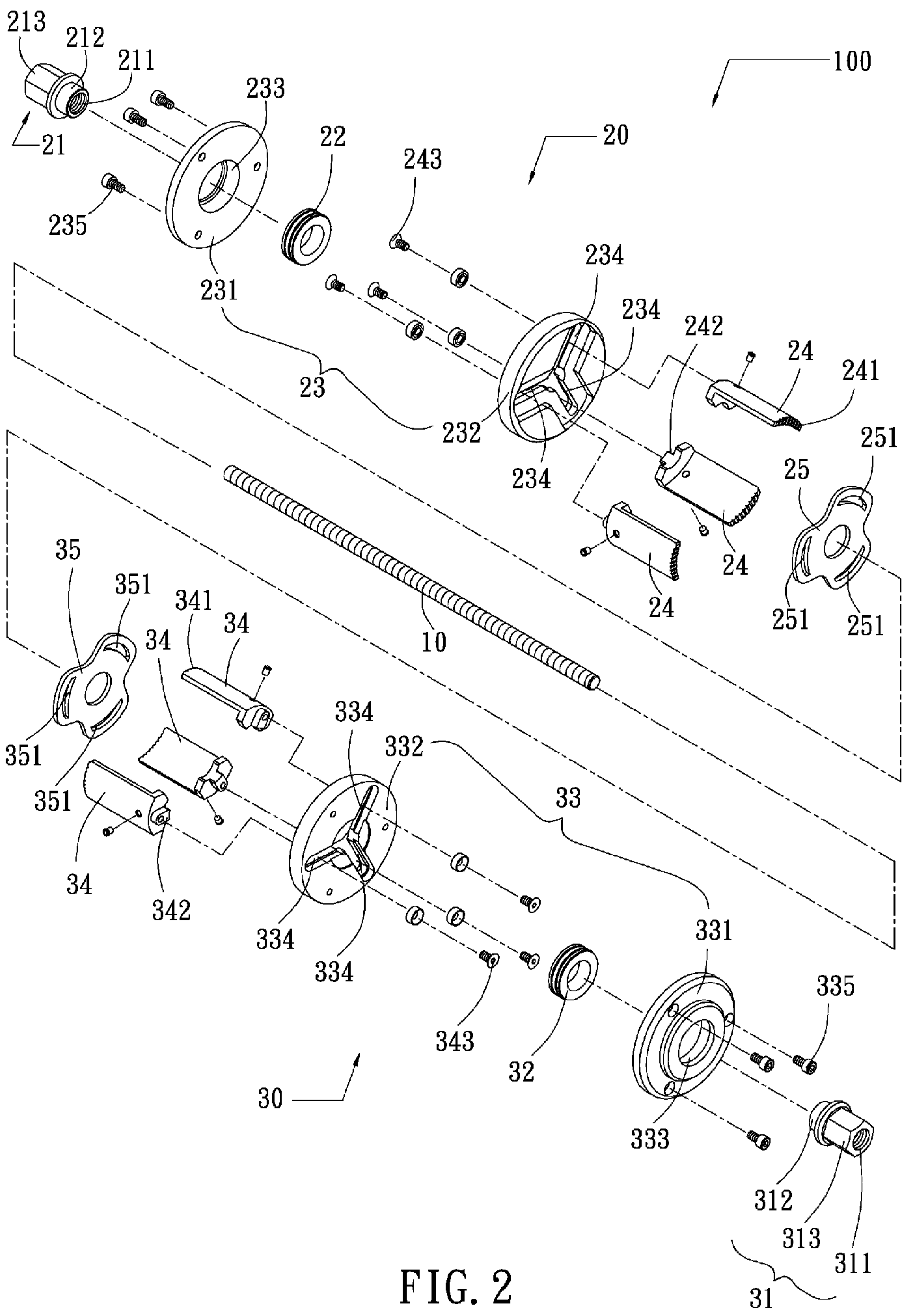
FIG. 2 is an exploded view of the universal tool shown in FIG. 1.
Figure 3:
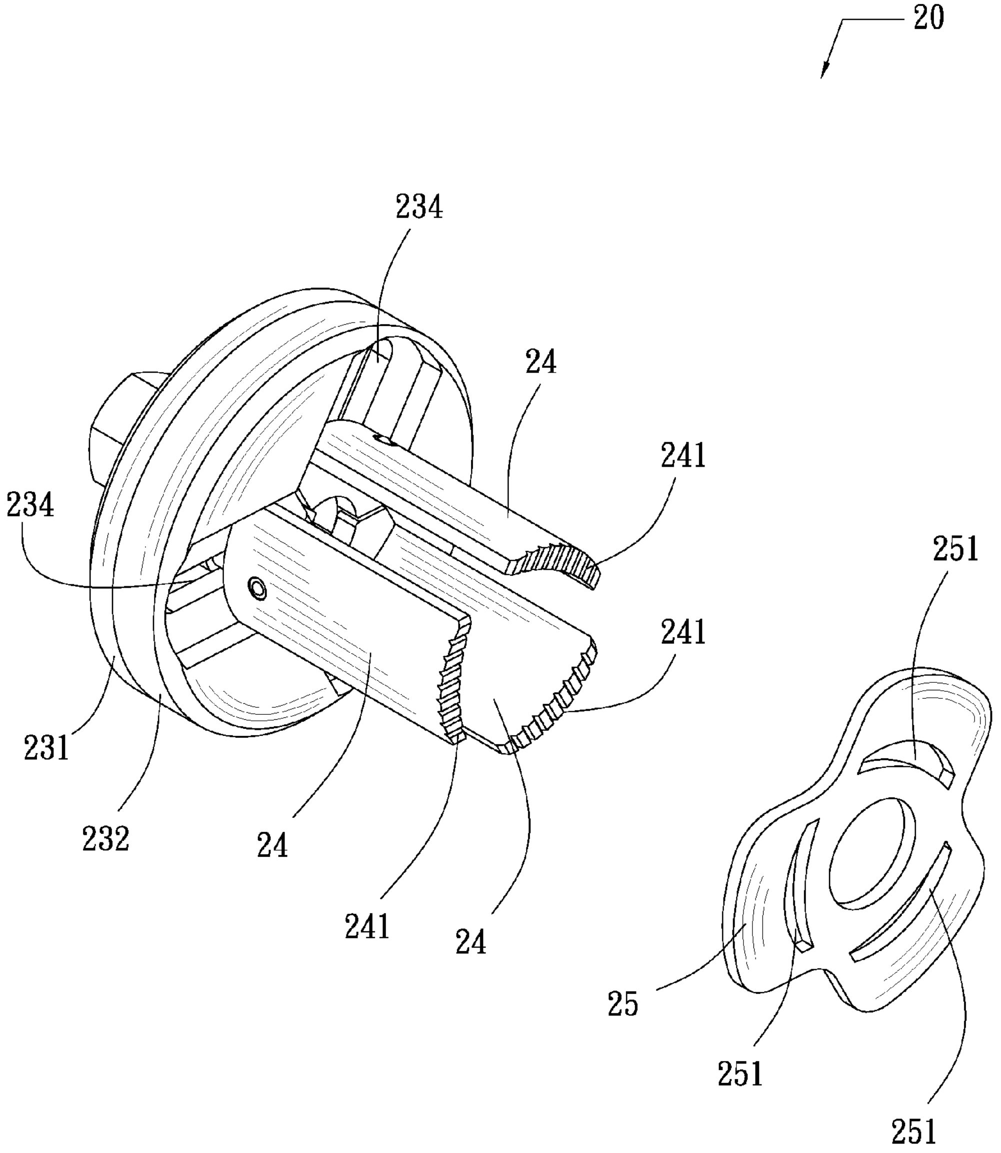
FIG. 3 is an exploded view of a first pushing unit of the universal tool shown in FIG. 1.
Figure 4:
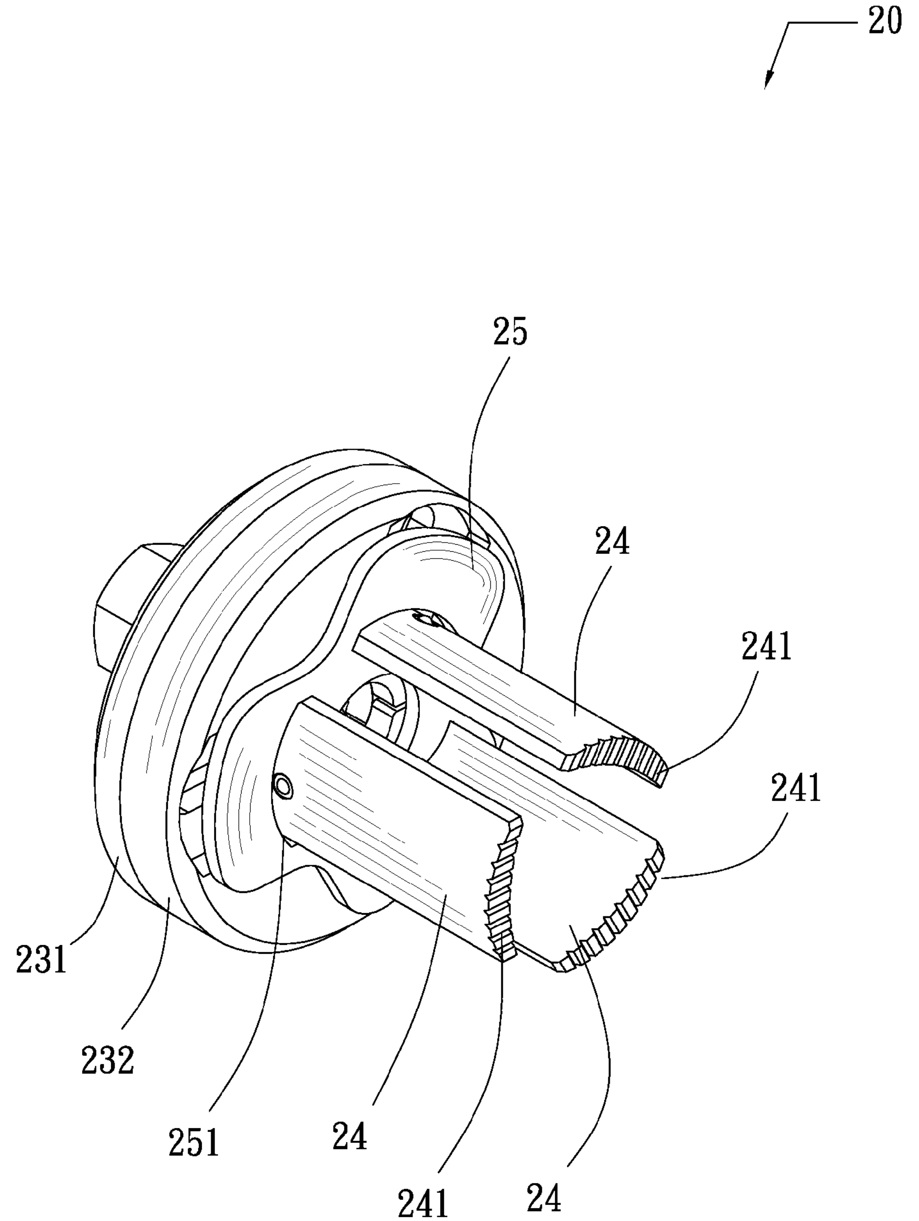
FIG. 4 is a perspective of the first pushing unit shown in FIG. 3.

Referring to FIGS. 2 through 4, the first pushing unit 20 includes a nut 21, a bearing 22, a mount 23, pushers 24 and positioning elements 25 of different sizes. The nut 21 of course includes a screw hole 211 defined therein. The nut 21 includes, on the periphery, a circular section 212, a non-circular section 213 and preferably an annular rib between the circular section 212 and the non-circular section 213. The non-circular section 213 is preferably a hexagonal section. However, the non-circular section 213 can be a square, octagonal or any other proper polygonal section.

The mount 23 includes a ring 231 and a pusher support 232. The ring 231 includes an aperture 233 centrally defined therein.

The bearing 22 is located on the circular section 212 of the nut 21 and located in the aperture 233 of the ring 231. Thus, the bearing 22 is located between the nut 21 and the ring 231 so that the nut 21 can be rotated while the ring 231 is not. A portion of the bearing 22 is located against the annular rib of the nut 21.

The pusher support 232 includes an aperture centrally defined therein and three slots 234 defined therein in a radial manner. The slots 234 are evenly located in the pusher support 232. That is, each of the slots 234 is 180 degrees from another slot 234.

Each of the pushers 24 includes teeth 241 formed at an end thereof and a slide 242 formed at an opposite end thereof. Each of the slides 242 is movably located in a related one of the slots 234. A screw 243 is driven in each of the slides 242. Thus, each of the slides 242 is retained movable in the related slot 243.

Screws 235 are driven in screw apertures defined in the pusher support 232 through apertures defined in the ring 231. Thus, the pusher support 232 is retained connected to the ring 231.

Each of the positioning elements 25, regardless of the size, includes an aperture centrally defined therein and three slots 251 defined therein. Each of the pushers 24 is inserted through a related one of the slots 251. Thus, the pushers 24 are positioned by a selected one of the positioning elements 25.

Figure 5:
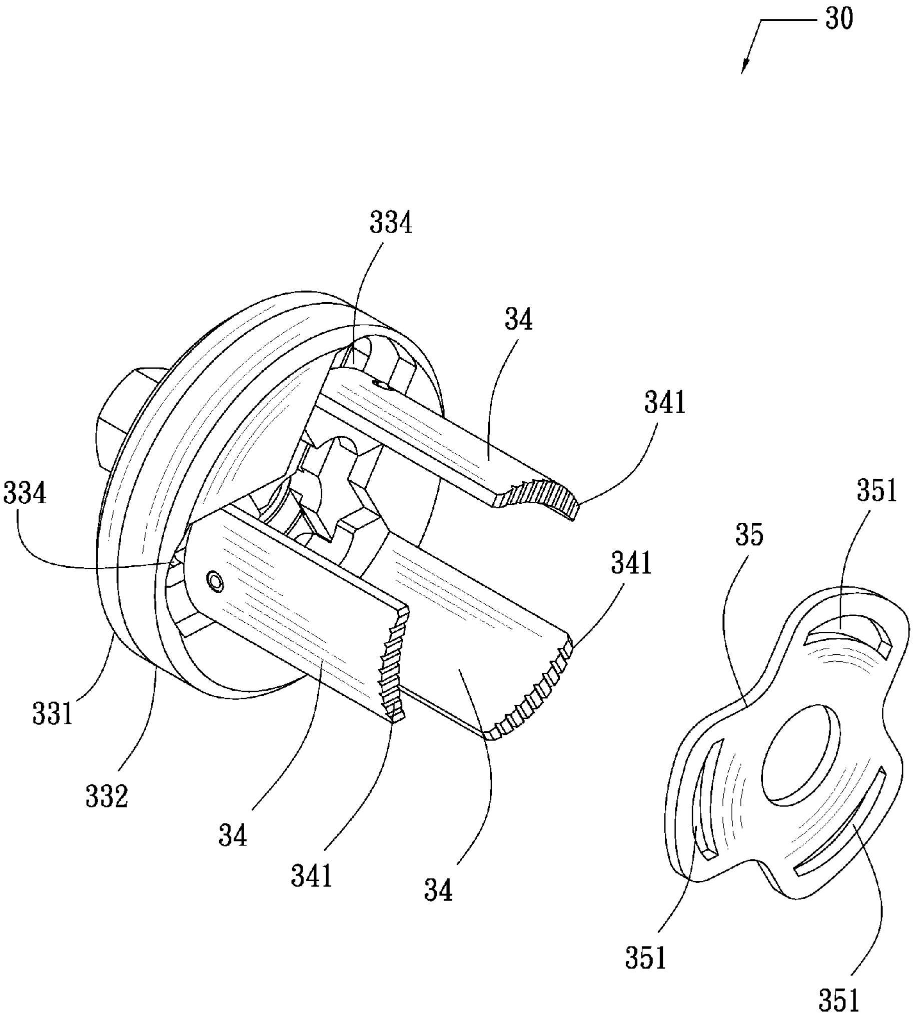
FIG. 5 is an exploded view of a first pushing unit of the universal tool shown in FIG. 1.
Figure 6:
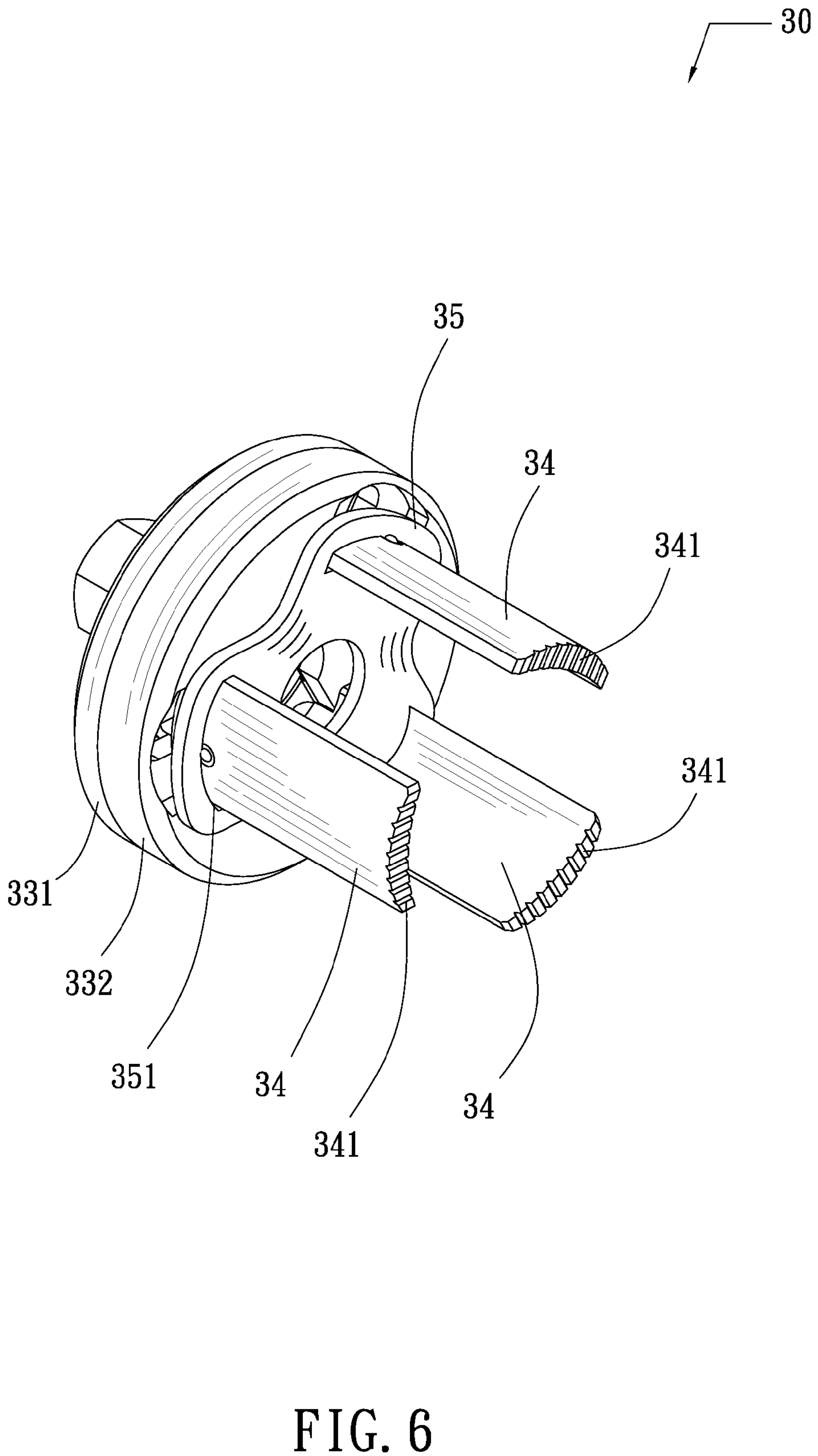
FIG. 6 is a perspective of the first pushing unit shown in FIG. 5.

Referring to FIGS. 2, 5 and 6, the second pushing unit 30 includes a nut 31, a bearing 32, a mount 33, pushers 34 and positioning elements 35 of different sizes. The nut 31 of course includes a screw hole 311 defined therein. The nut 31 includes, on the periphery, a circular section 312, a non-circular section 313 and preferably an annular rib between the circular section 312 and the non-circular section 313. The non-circular section 313 is preferably a hexagonal section. However, the non-circular section 313 can be a square, octagonal or any other proper polygonal section.

The mount 33 includes a ring 331 and a pusher support 332. The ring 331 includes an aperture 333 centrally defined therein.

The bearing 32 is located on the circular section 312 of the nut 31 and located in the aperture 333 of the ring 331. Thus, the bearing 32 is located between the nut 31 and the ring 331 so that the nut 31 can be rotated while the ring 331 is not. A portion of the bearing 32 is located against the annular rib of the nut 31.

The pusher support 332 includes an aperture centrally defined therein and three slots 334 defined therein in a radial manner. The slots 334 are evenly located in the pusher support 332. That is, each of the slots 334 is 180 degrees from another slot 334.

Each of the pushers 34 includes teeth 341 formed at an end thereof and a slide 342 formed at an opposite end thereof. Each of the slides 342 is movably located in a related one of the slots 334. A screw 343 is driven in each of the slides 342. Thus, each of the slides 342 is retained movable in the related slot 343.

Screws 335 are driven in screw apertures defined in the mount 332 through apertures defined in the ring 331. Thus, the mount 332 is retained connected to the ring 331.

Each of the positioning elements 35, regardless of the size, includes an aperture centrally defined therein and three slots 351 defined therein. Each of the pushers 34 is inserted through a related one of the slots 351. Thus, the pushers 34 are positioned by a selected one of the positioning elements 35.

Figure 7:
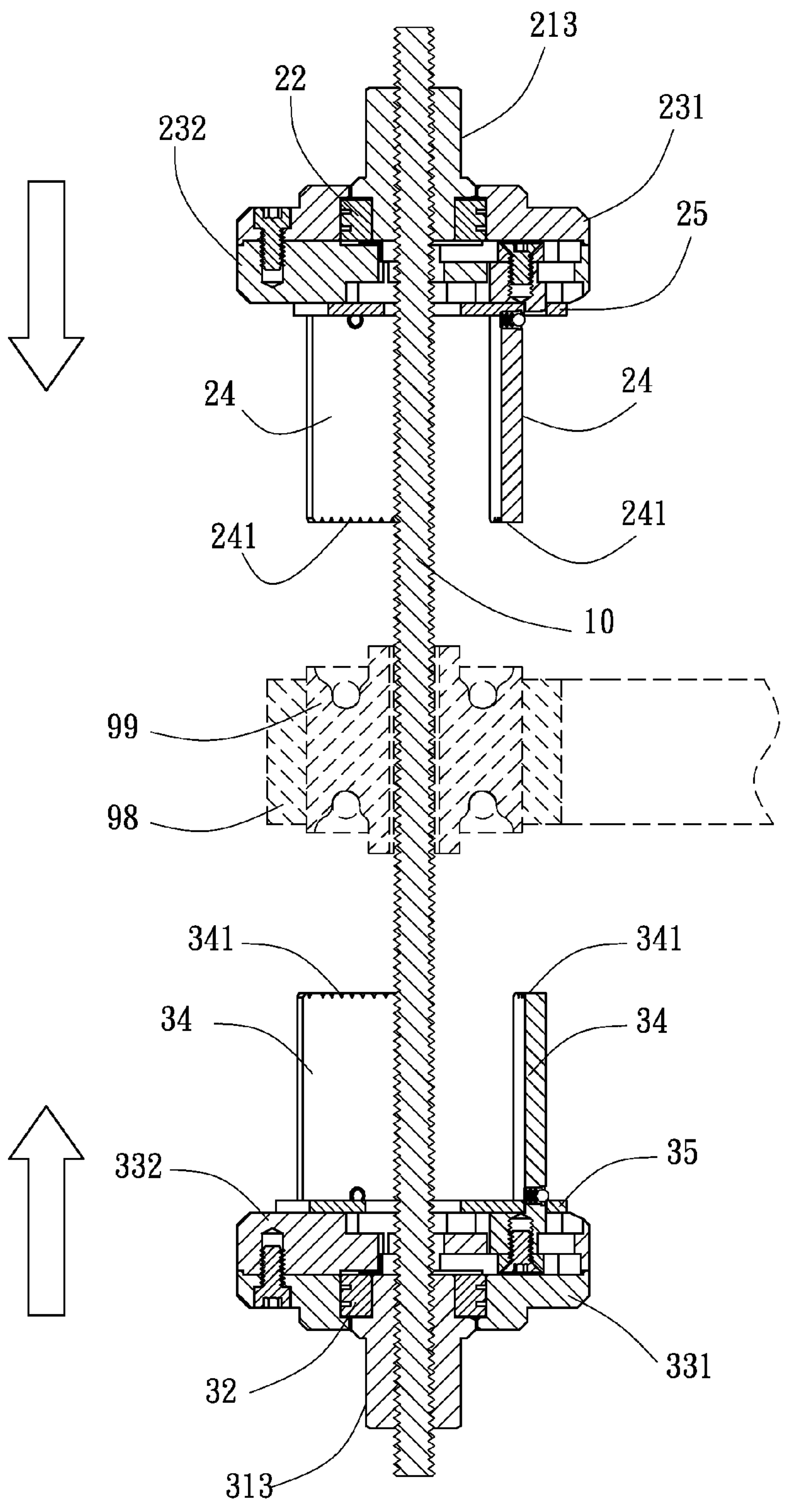
FIG. 7 is a cross-sectional view of the universal tool shown in FIG. 1.

Referring to FIG. 7, a rubber bushing includes an external ring 98 located around an internal ring 99. The threaded rod 10 is inserted through the internal ring 99. The nuts 21 and 31 are engaged with the threaded rod 10. The rubber bushing is located between the first pushing unit 20 and the second pushing unit 30. By engaging wrenches with the non-circular sections 213 and 313 of the nuts 21 and 31, the nuts 21 and 31 can be rotated. Thus, the pushers 24 are moved toward or away from the pushers 34.

Figure 8:
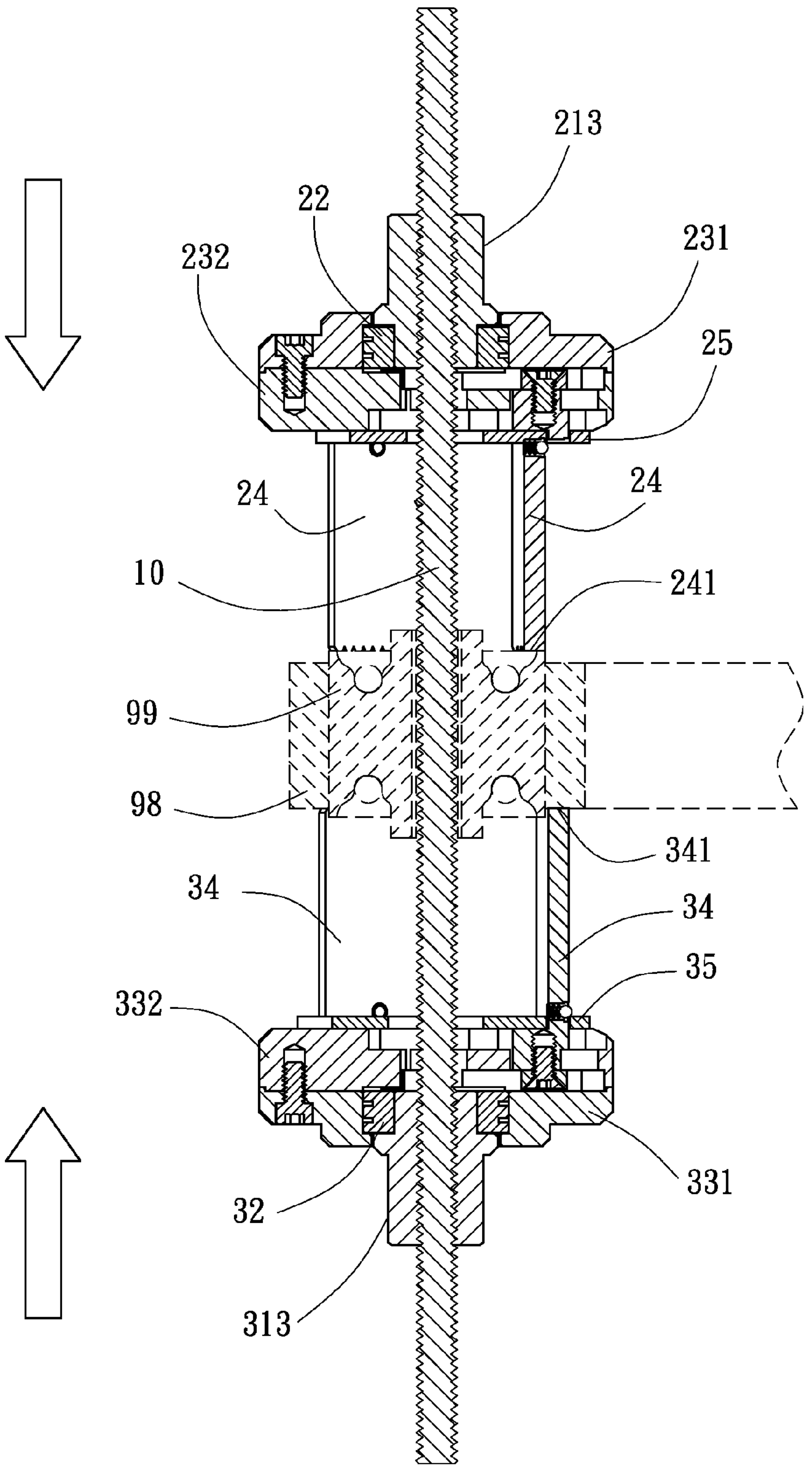
FIG. 8 is a cross-sectional view of the universal tool in another position than shown in FIG. 7.

Referring to FIG. 8, the pushers 24 abut the internal ring 99, and the pushers 34 abut the external ring 98. The contact of the internal ring 99 with the pushers 24 is firm because of the teeth 241. The contact of the external ring 98 with the pushers 34 is firm because of the teeth 341.

Figure 9:
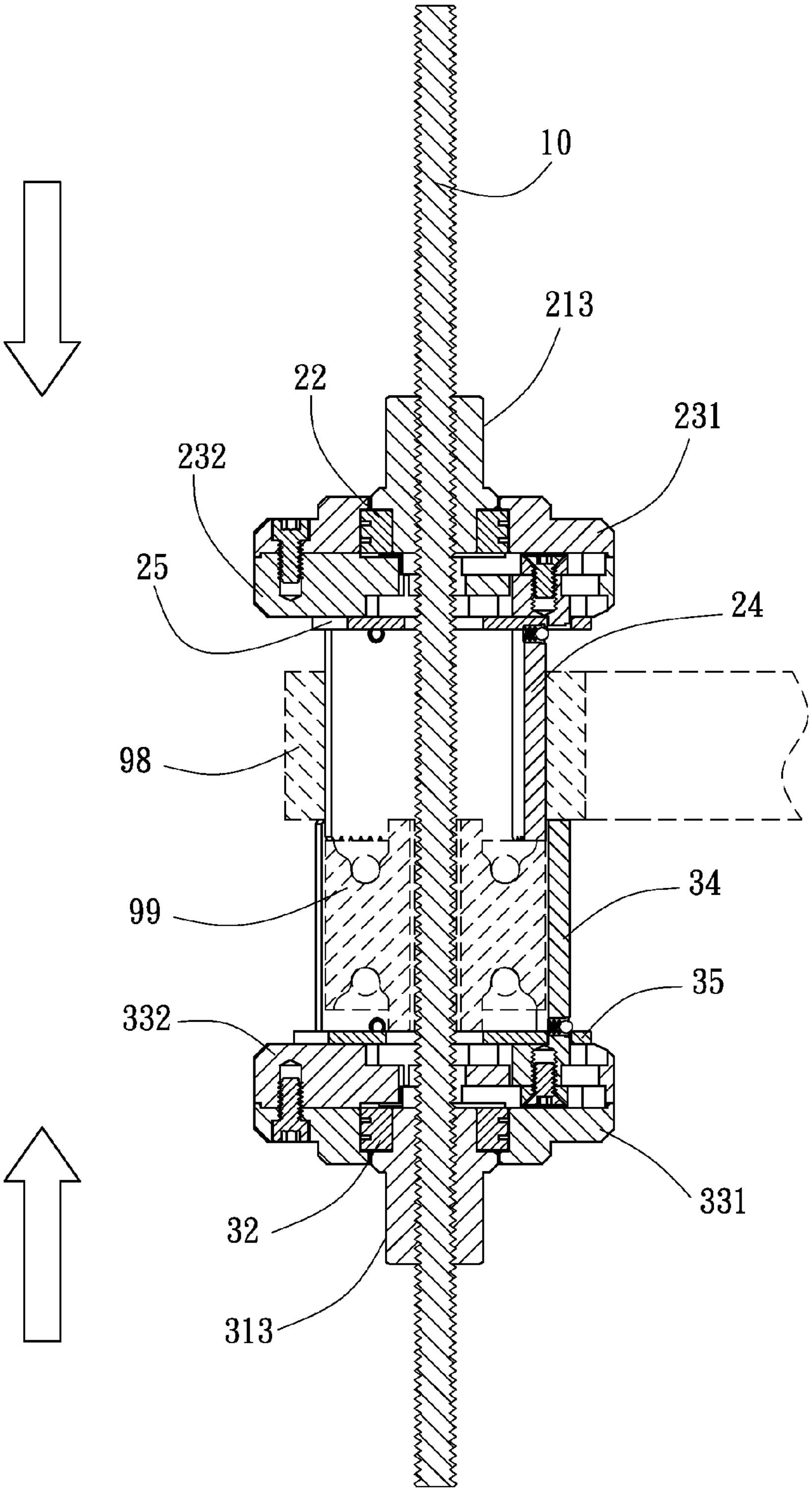
FIG. 9 is a cross-sectional view of the universal tool in another position than shown in FIG. 8.

Referring to FIG. 9, the nuts 21 and 31 are further rotated. Thus, the internal ring 99 is pushed away from the external ring 98 by the pushers 24 and 34.

A proper one of the positioning elements 25 is selected so that the diameter of a circle defined by the slots 251 is smaller but close to the external diameter of the internal ring 99. Thus, the selected element 25 retains the pushers 24 in a proper position so that the pushers 24 can effectively push the internal ring 99. A proper one of the positioning elements 35 is selected so that the diameter of a circle defined by the slots 351 is larger but close to the external diameter of the external ring 98. Thus, the selected positioning element 35 retains the pushers 24 in a proper position so that the pushers 34 can effectively push the external ring 98.

Advantageously, the universal tool 100 is light and compact for including the positioning elements 25 and 35 that are light and thin. Moreover, the universal tool 100 is inexpensive for including the positioning elements 25 and 35 that inexpensive.

The present invention has been described via the detailed illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A universal rubber bushing-extracting tool including:
a threaded rod; and
two pushing units each including:
a nut engaged with the threaded rod;
a mount including at least two slots defined therein;
a bearing for bearing the mount on the nut; and
at least two pushers each movably located in a related one of the slots,
wherein the pushers of one of the pushing units push an internal ring of a rubber bushing and the pushers of the other pushing unit push an external ring of the rubber bushing.

2. The universal rubber bushing-extracting tool according to claim 1, wherein the nut includes a circular section for supporting the bearing.

3. The universal rubber bushing-extracting tool according to claim 1, wherein the nut includes a non-circular section for engagement with a wrench.

4. The universal rubber bushing-extracting tool according to claim 3, wherein the non-circular section is a polygonal section.

5. The universal rubber bushing-extracting tool according to claim 1, wherein the mount includes:
a ring supported on the bearing; and
a pusher support connected to the ring, wherein the slots are defined in the pusher support.

6. The universal rubber bushing-extracting tool according to claim 5, wherein each of the pushing units further includes at least two screws for connecting the pusher support to the ring.

7. The universal rubber bushing-extracting tool according to claim 1, wherein the slots are evenly defined in the mount in a radial manner.

8. The universal rubber bushing-extracting tool according to claim 1, wherein each of the pushers includes a slide formed at an end thereof and movably located in the related slot.

9. The universal rubber bushing-extracting tool according to claim 8, wherein each of the pushing units further includes at least two screws each driven in the slide of a related one of the pushers to retain the slide movably located in the related slot.

10. The universal rubber bushing-extracting tool according to claim 1, wherein each of the pushers includes teeth formed at an end thereof for firm contact with the related one of the internal and external rings of the rubber bushing.

11. The universal rubber bushing-extracting tool according to claim 1, wherein each of the pushing units includes at least one positioning element including at least two slots through each of which a related one of the pushers is inserted.

12. The universal rubber bushing-extracting tool according to claim 11, wherein the slots of the positioning element are evenly defined in each of the pushing units.

* * * * *